US007375056B2

(12) United States Patent
Wei et al.

(10) Patent No.: US 7,375,056 B2
(45) Date of Patent: May 20, 2008

(54) METHOD OF MAKING A NOX ADSORBER CATALYST

(75) Inventors: Ming Wei, Broken Arrow, OK (US); Danan Dou, Tulsa, OK (US)

(73) Assignee: Unicore AG & co. KG, Hanau (DE)

( * ) Notice: Subject to any disclaimer, the term of this patent is extended or adjusted under 35 U.S.C. 154(b) by 846 days.

(21) Appl. No.: 10/625,918

(22) Filed: Jul. 23, 2003

(65) Prior Publication Data

US 2005/0020443 A1 Jan. 27, 2005

(51) Int. Cl.
*B01J 21/04* (2006.01)

(52) U.S. Cl. ........................................................ 502/439

(58) Field of Classification Search ................ 502/317, 502/344, 439

See application file for complete search history.

(56) References Cited

U.S. PATENT DOCUMENTS 5,866,210 A 2/1999 Rosynsky et al.
6,217,831 B1 * 4/2001 Suzuki et al. ............... 422/177
6,391,822 B1 5/2002 Dou et al.
6,729,125 B2 * 5/2004 Suga et al. ................... 60/285

* cited by examiner

*Primary Examiner*—Edward M. Johnson
(74) *Attorney, Agent, or Firm*—Robert G. Weilacher; Smith, Gambrell & Russell

(57) ABSTRACT

A treatment element and an exhaust emission control device for the treatment of gases in an exhaust passage of an internal combustion engine and methods of making thereof are described. In the method, at least two different catalyst compositions are applied along the major axis length of a single substrate to form a treatment element having at least two different zones of catalyst composition.

16 Claims, 2 Drawing Sheets

METHOD OF MAKING A NOX ADSORBER CATALYST

BACKGROUND

This disclosure relates to $NO_x$ adsorber catalyst systems for reduction of the amount of undesirable emissions components emitted in automotive exhaust gases and to methods of making $NO_x$ adsorber catalyst systems.

In order to meet exhaust gas emission standards, the exhaust emitted from internal combustion engines is treated prior to emission into the atmosphere. Typically, exhaust gases are routed through an exhaust emission control device disposed in fluid communication with the exhaust outlet system of the engine, where the gases are treated by reactions with a catalyst composition deposited on a porous support material. The exhaust gases generally contain undesirable emission components such as carbon monoxide (CO), hydrocarbons (HC), and nitrogen oxides ($NO_x$). As a means of simultaneously removing the objectionable CO, HC, and $NO_x$ components from the exhaust stream, various "three-way" catalyst compositions have been developed for internal combustion engines operating with stoichiometric air-to-fuel ratios. When operating under lean-combustion conditions (i.e, where the air-to-fuel ratio is adjusted to be somewhat greater than the stoichiometric ratio), however, typical three-way catalyst systems are relatively efficient in oxidizing unburned HC and CO, but are inefficient in reducing $NO_x$ emission components. To remove nitrogen oxides from the exhaust gases of internal combustion engines operating under lean-combustion conditions, $NO_x$ adsorbers are one approach for treating nitrogen oxides in exhaust gases.

$NO_x$ adsorbers comprise precious metals such as platinum group metals, in combination with alkali or alkaline earth elements, and combinations thereof. The catalytic material in the adsorber acts first to oxidize NO to $NO_2$. The $NO_2$ then reacts with the alkali and/or alkaline earth materials to form nitrate salts. While the alkali element potassium, for example, forms more stable nitrate salts than the alkaline earth element barium, potassium can deactivate the platinum group metals. U.S. Pat. No. 6,391,822 discloses a dual $NO_x$ adsorber catalyst system in which a first catalyst composition comprises a noble metal component and an alkaline earth element component and a second catalyst composition comprises a noble metal component, an alkaline earth element component and an alkali element component. The separation of the two catalyst compositions is accomplished by providing each catalyst on a separate substrate component or "brick" within the exhaust emission control device. While suitable for its intended purpose, there nonetheless remains a need for alternative methods of providing catalyst compositions in $NO_x$ adsorber catalyst systems.

SUMMARY OF THE DISCLOSURE

A method of making a treatment element for an exhaust emission control device comprises applying a first catalyst composition along a first portion of a major axis of a single substrate; applying a second catalyst composition along a second portion of the major axis of the single substrate to form a first catalyst zone and a second catalyst zone; and calcining the substrate; wherein the first catalyst zone and the second catalyst zone are different. An exhaust emission control device comprises the foregoing treatment element, having a retention element disposed thereon and with the treatment element and the retention element disposed within a shell.

A method of making an exhaust emission control device comprises applying a first catalyst composition along a first portion of a major axis of a single substrate; applying a second catalyst composition along a second portion of the major axis of the single substrate; calcining the substrate to form a treatment element comprising a first catalyst zone and a second catalyst zone wherein the first catalyst zone and the second catalyst zone are different; and disposing the treatment element within a shell and disposing a retention element therebetween.

Another treatment element for an exhaust emission control device comprises a first catalyst zone and a second catalyst zone disposed on a single substrate, wherein the first catalyst zone is disposed along about 10% to about 90% of the total major axis length of the substrate and the second catalyst zone is disposed along about 10% to about 90% of the total major axis length of the substrate, and wherein the first catalyst zone and the second catalyst zone are different.

The above described and other features are exemplified by the following figures and detailed description.

BRIEF DESCRIPTION OF THE DRAWINGS

Referring now to the figures, in which.

DETAILED DESCRIPTION

Figure 1:
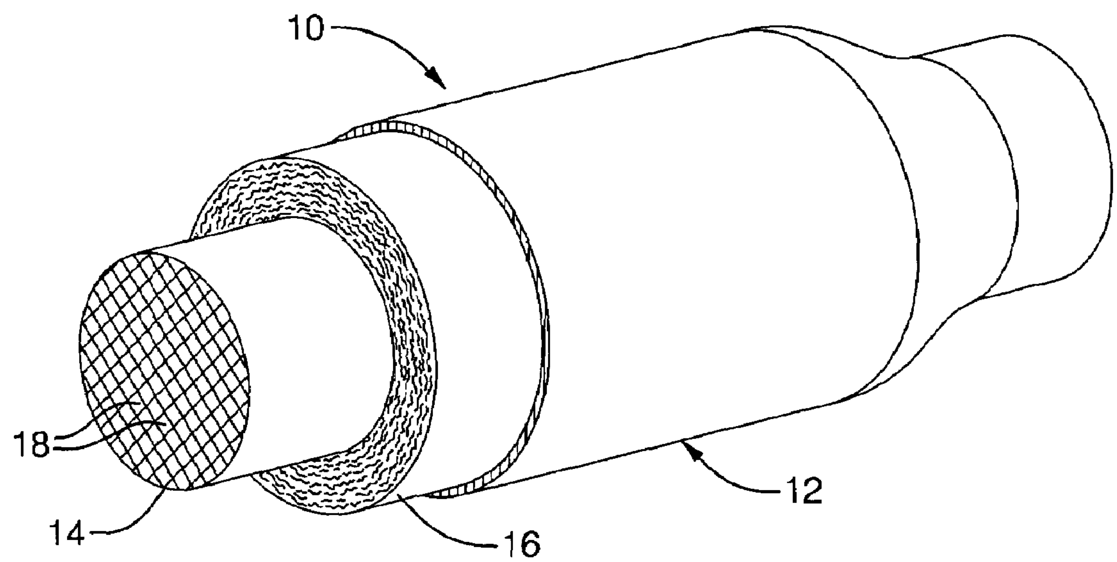
FIG. 1 is a schematic of a catalytic converter.

Exhaust emission control devices for use with internal combustion engines may comprise catalytic converters, evaporative emissions devices, scrubbing devices (e.g., those designed to remove hydrocarbon, sulfur, and the like), particulate filters/traps, adsorbers/absorbers, non-thermal plasma reactors, and the like, as well as combinations comprising at least one of the foregoing devices. As shown in FIG. 1, an exemplary exhaust emission control device 10 includes an outer metallic housing or shell 12, a treatment element 14, and a retention element 16 disposed therebetween. The treatment element 14 converts, and/or eliminates one or more undesirable emission components from an exhaust gas stream.

Figure 2:
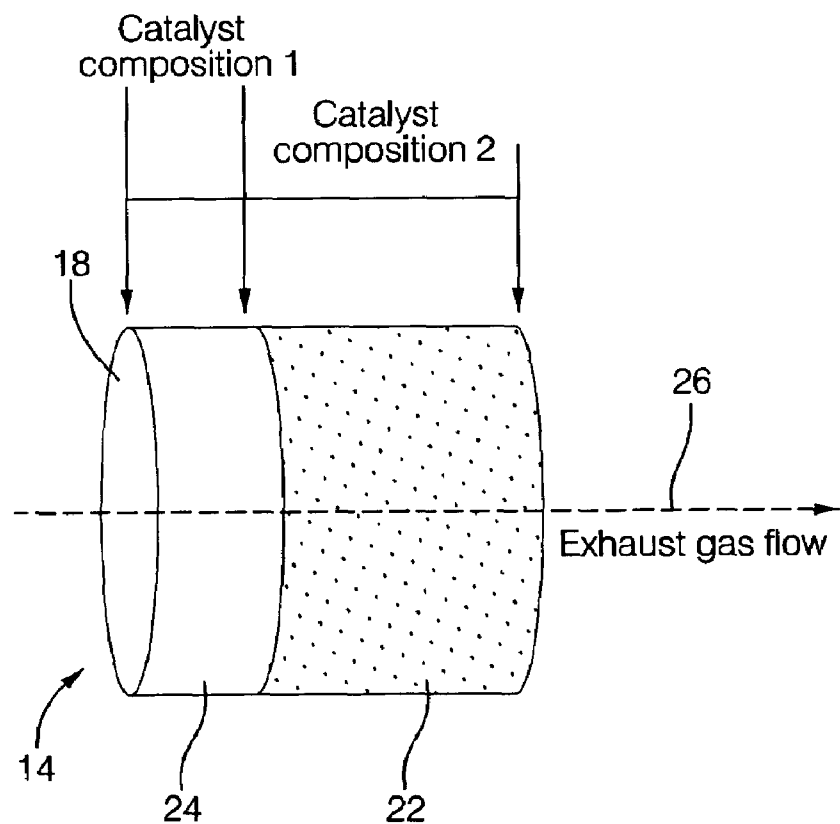
FIG. 2 is a schematic of a $NO_x$ adsorber of the present disclosure.

Referring to FIG. 2, the treatment element 14 of the present disclosure comprises multiple catalyst compositions applied to a common substrate. In the embodiment shown, first and second catalyst compositions are applied to a single substrate 18 to form two substantially separate catalytic zones (bands) 22,24 along a major axis (e.g., an exhaust flow path) 26 of the treatment element 14. By applying the catalyst compositions as separate zones 22,24 on a single substrate 18, a combination of good catalytic performance and a simple manufacturing procedure for the exhaust emission control device 10 can be achieved. In addition, by adjusting the volume ratio of each catalyst zone 22,24 relative to the total volume of the substrate 18, the composition of the catalysts, and the amount of catalyst composition within each zone 22,24, catalyst performance for removing different emission components can be optimized for various applications.

The catalyst compositions used in each catalyst zone can comprise a noble metal component, an alkaline earth metal component, an alkali element component, a high surface area support material, and mixtures comprising one or more of the foregoing components.

Suitable noble metal components include, for example, platinum, palladium, rhodium, iridium, osmium, ruthenium, and the like, as well as oxides, alloys, and combinations comprising one or more of the foregoing noble metal components. Preferred noble metal components include platinum, palladium, rhodium, as well as oxides, alloys, and combinations comprising one or more of the foregoing noble metal components.

Suitable alkaline earth metal components include, for example, barium, strontium, calcium, magnesium, and the like, as well as oxides, carbonates, and combinations comprising one or more of the foregoing alkaline earth metal components. Barium and strontium, as well as oxides, carbonates, and combinations comprising one or more of the foregoing alkaline earth metal components are preferred.

Suitable alkali element components include, for example, cesium, potassium, sodium, lithium, and the like, as well as oxides, carbonates, and combinations comprising one or more of the foregoing alkali element components. Lithium, sodium, potassium, and cesium, as well as oxides, carbonates, and combinations comprising one or more of the foregoing alkali element components are preferred.

Suitable high surface area support materials include aluminum oxides (e.g., gamma-alumina, theta-alumina, delta-alumina), cerium oxides, gallium oxides, zirconium oxides, zeolites, hexaaluminates, aluminates, zirconium titanium solid solutions, zirconium titanium aluminum solid solutions, zirconium titanium oxides, titanium oxides, zirconium oxides, aluminum oxides, zirconium toughened alumina, titanium toughened alumina, as well as combinations comprising one or more of the foregoing materials.

The catalyst compositions used in each catalyst zone are different. By different, it is meant that at least on catalyst component is different between the catalyst compositions, or that at least one component is present in a different amount in the two catalyst compositions. By a different amount, it is meant that the one catalyst component differs in concentration by greater than or equal to about 5%, 10%, 20%, 25%, 30%, 40%, or 50% between he two catalyst compositions. In the two-zone embodiment shown in FIG. 2, for example, the first catalyst composition used in catalyst zone 24 comprises a noble metal component and an alkaline earth metal component, with the noble metal component preferably being platinum, palladium, and/or rhodium. When the platinum group metal component comprises platinum, the platinum can be employed at about 20 grams per cubic foot (g/ft$^3$) to about 150 g/ft$^3$, based on the total volume of the substrate. Within this range, greater than or equal to about 20 g/ft$^3$ is preferred, more preferably greater than or equal to about 50 g/ft$^3$. Also within this range, less than or equal to about 150 g/ft$^3$ is preferred, more preferably less than or equal to about 110 g/ft$^3$. When the platinum group metal component comprises palladium, the palladium can be employed at about 10 g/ft$^3$ to about 80 g/ft$^3$, based on the total volume of the substrate. Within this range, less than or equal to about 80 g/ft$^3$ can be employed, preferably less than or equal to about 50 g/ft$^3$. When the platinum group metal component comprises rhodium, the rhodium can be employed at about 3 g/ft$^3$ to about 30 g/ft$^3$, based on the total volume of the substrate. Within this range, greater than or equal to about 3 g/ft$^3$ is preferred, more preferably greater than or equal to about 5 g/ft$^3$. Also within this range, less than or equal to about 30 g/ft$^3$ is preferred, more preferably less than or equal to about 15 g/ft$^3$. The alkaline earth metal component can comprise about 180 g/ft$^3$ to about 2904 g/ft$^3$ of the first catalyst composition, based on the volume of the substrate. Within this range, greater than or equal to about 180 g/ft$^3$ is preferred, more preferably greater than or equal to about 363 g/ft$^3$. Also within this range, less than or equal to about 2904 g/ft$^3$ is preferred, more preferably less than or equal to about 1452 g/ft$^3$. The support component can be employed at about 1 g/in$^3$ to about 6 g/in$^3$, based on the total volume of the substrate. Within this range, greater than or equal to about 1 g/in$^3$ is preferred, more preferably greater than or equal to about 2 g/in$^3$. Also within this range, less than or equal to about 6 g/in$^3$ is preferred, more preferably less than or equal to about 5 g/in$^3$. Preferably, the first catalyst composition is free of alkali element components. By free of alkali element components, it is meant that the catalyst composition comprises less than or equal to about 10 g/ft$^3$ of alkali elements. When an alkali element is present in the first catalyst composition, it is present in the same ranges as described below for the second catalyst composition so long as the amount in the first catalyst composition is different than the amount in the second catalyst composition.

The second catalyst composition, used in catalyst zone 22, preferably comprises a platinum group metal component, an alkali element component, and optionally an alkaline earth metal component. The platinum group metal component can comprise platinum, palladium and rhodium in the same ranges as the first catalyst composition. The alkali element component can comprise about 70 g/ft$^3$ to about 1104 g/ft$^3$ of the first catalyst composition, based on the total weight of the first catalyst composition. Within this range, greater than or equal to about 70 g/ft$^3$ is preferred, more preferably greater than or equal to about 138 g/ft$^3$. Also within this range, less than or equal to about 1104 g/ft$^3$ is preferred, more preferably less than or equal to about 552 g/ft$^3$. The optional alkaline earth metal component can be employed in the same ranges as in the first catalyst composition. The support component can be employed in the same ranges as in the first catalyst composition.

In one embodiment, the treatment element can be employed in an exhaust stream in an orientation wherein the first catalyst composition without the alkali element component (zone 24) first contacts the exhaust stream. The second catalyst composition comprising an alkali element component (zone 22) is thus downstream of the first catalyst composition. Alternatively, the treatment element can be employed in an exhaust stream in an orientation wherein the second catalyst composition contacts the exhaust stream before the first catalyst composition.

The substrate 18 preferably comprises a material designed for use in a spark ignition or diesel engine environment and having the following characteristics: (1) capable of operating at temperatures up to about 600° C., and up to about 1,200° C. or higher for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst. Some possible materials include cordierite, silicon carbide, silicon nitrate, metal, metal oxides (e.g., alumina, and the like), glasses, and the like, and mixtures comprising at least one of the foregoing materials. These materials can be in the form of monoliths (e.g., a honeycomb structure, and the like), foils, preforms, mats, fibrous materials, other porous structures (e.g., porous glasses, sponges), foams, pellets, particles, sieves, and the like (depending upon the particular device), and a combination comprising one or more of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate 18 size and geometry are not critical, the size and geometry are preferably chosen to optimize surface area in the given exhaust emission control device design parameters. Typically, the substrate 18 has a honeycomb geometry, with the combs through-channel having a multi-sided or rounded shape, with substantially square, triangular, hexagonal, or similar geometries preferred due to ease of manufacturing and increased surface area. The substrate 18 comprises a single unit or brick.

To form the treatment element 14 with multiple catalytic zones 22,24, the catalyst compositions can be applied to the substrate in a stepwise manner. Based on the desired composition of catalytic components in the designated zones, the catalytically active components are preferably applied onto the substrate in the form of a slurry. As used herein, the term slurry encompasses slurries, suspensions and solutions comprising the various catalyst components, so long as the catalyst components are in a form suitable for application to a substrate. The treatment element can be formed by multiple application steps. Application of a slurry can be performed by washcoating, imbibing, impregnating, physisorbing, chemisorbing, precipitating, or otherwise applying to the catalyst substrate.

For example, to form the first zone 24, a first catalyst slurry can be applied to a first portion of the substrate 18. If the first catalyst slurry comprises catalyst components desired in multiple catalyst zones, the first slurry may be applied to more than one zone or even the entire substrate. Once applied, the excess slurry can be removed by, for example, applying an air flow through the channels of the substrate 18. The air flow is applied in the opposite direction to that in which the slurry is being applied so that the components in this slurry will have minimal contact with any substrate zone where these components are not desired. This air flow can be generated by applying an air pressure difference at the both ends of the substrate, either by applying a vacuum or pressurized air. The substrate 18 comprising the first catalyst composition is then optionally calcined to fix the catalyst composition onto the substrate 18. If performed, calcining is preferably performed at a temperature of about 200° C. to about 700° C. for a time of about 30 minutes to about 6 hours.

To form the second zone 22, a second catalyst slurry can be applied to a second portion of the substrate and the excess slurry removed. The first portion and the second portion of the substrate may overlap, so long as the two zones that are formed are not identical. By not identical, it is meant that the two zones comprise different catalyst components, or that the two zones comprise the same components at different concentrations.

Any other subsequent catalyst compositions are then applied to portions of the substrate to form additional zones using a similar process to that described for the first zone (i.e., the slurry or solution is applied to the substrate, excess slurry is removed, and the substrate comprising the catalyst composition is calcined). In this manner, a treatment element comprising multiple zones with different catalyst compositions can be made.

For different applications, the volume ratio of each zone with respect to the total substrate volume may be varied. The first catalyst composition is preferably disposed along about 10% to about 90% of the total major axis length of the substrate, more preferably about 20% to about 80% of the total major axis length of the substrate. The second catalyst composition is preferably disposed along about 10% to about 90% of the total major axis length of the substrate, more preferably about 20% to about 80% of the total major axis length of the substrate.

After the treatment element 14 is formed, it may then be assembled along with the outer shell 12, and retention element 16 to form an exhaust emission control device 10.

The retention element 16 insulates the shell from both the high exhaust gas temperatures and the exothermic catalytic reaction occurring within the treatment element. The retention element 16, which enhances the structural integrity of the treatment element by applying compressive radial forces about it, reducing its axial movement and retaining it in place, is typically concentrically disposed around the treatment element 14 to form a retention element 16/treatment element 14 subassembly.

The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials (e.g., ceramic fibers) and other materials such as organic and inorganic binders and the like, or combinations comprising one or more of the foregoing materials.

The retention element 16/treatment element 14 subassembly can be concentrically disposed within a shell or housing 12. The choice of material for the shell 12 depends upon the type of exhaust gas, the maximum temperature reached by the treatment element 14, the maximum temperature of the exhaust gas stream, and the like. Suitable materials for the shell 12 include materials capable of resisting under-car salt, temperature, and corrosion.

Also, similar materials as the housing, end cone(s), end plate(s), exhaust manifold cover(s), and the like, can be concentrically fitted about the one or both ends and secured to the housing to provide a gas tight seal. These components can be formed separately (e.g., molded or the like), or can be formed integrally with the housing using a methods such as, e.g., a spin forming, or the like.

The exhaust emission control device 10 can be manufactured by one or more techniques, and, likewise, the retention element 16/treatment element 14 subassembly can be disposed within the shell 12 using one or more methods. For example, the retention element 16/treatment element 14 subassembly can be inserted into a variety of shells 12 using a stuffing cone. The stuffing cone is a device that compresses the retention material concentrically about the treatment element 14. The stuffing cone then stuffs the compressed retention element 16/treatment element 14 subassembly into the shell 12, such that an annular gap preferably forms between the treatment element and the interior surface of the shell 12 as the retention material becomes compressed about the treatment element. Alternatively, if the retention material is in the form of particles (e.g., pellets, spheres, irregular objects, or the like) the treatment element 14 can be stuffed into the shell and the retention material can be disposed in the shell 12 between the treatment element and the shell.

In an alternative method, for example, the shell 12 can comprise two half shell components, also known as clamshells. The two half shell components are compressed together about the retention element 16/treatment element 14 subassembly, such that an annular gap preferably forms between the treatment element 14 and the interior surface of each half shell as the retention material becomes compressed about the treatment element 14.

In yet another method for forming the exhaust emission control device 10, the shell 12 can have a non-circular cross-sectional geometry (e.g., oval, oblong, and the like). Such non-circular shell designs are preferably manufactured by employing a half shell, preferably a die formed clamshell, which, when combined with another half, can form the desired non-circular geometry. The retention element 16/treatment element 14 subassembly can be placed within one of the half shells. The other half shell can then be attached to that half shell, such that an annular gap preferably forms between the treatment element and the interior surface of each half shell (i.e., the area comprising the retention material). The half shells can be welded together, preferably using a roller seam welding operation.

The "tourniquet" method of forming the exhaust emission control device comprises wrapping the shell 12 (e.g., in the form of a sheet) around the retention element 16/treatment element 14 subassembly. The adjoining edges of the shell are welded together while the assembly is squeezed at rated pressures calculated to optimize the retention material density. The end-cones/end-plates or the like, are then welded to the shell to form the exhaust emission control device 10. Although this method also has the disadvantages of increased cost due to the number of components that have to be processed and the added cost of welding wires and gases, it claims improved retention material density control.

In all of the above methods, the ends of the shell 12 can be sized, e.g., using a spinform method, to form a conical shaped inlet and/or a conical shaped outlet, thus eliminating the need for separate endcone assemblies in at least one embodiment of the exhaust emission control device. In the alternative, one or both ends of the shell can also be sized so that an end cone, an end plate, an exhaust gas manifold assembly, or other exhaust system component, and a combination comprising at least one of the foregoing components, can be attached to provide a gas tight seal.

The catalyst is further illustrated by the following non-limiting example.

EXAMPLE

Figure 3:
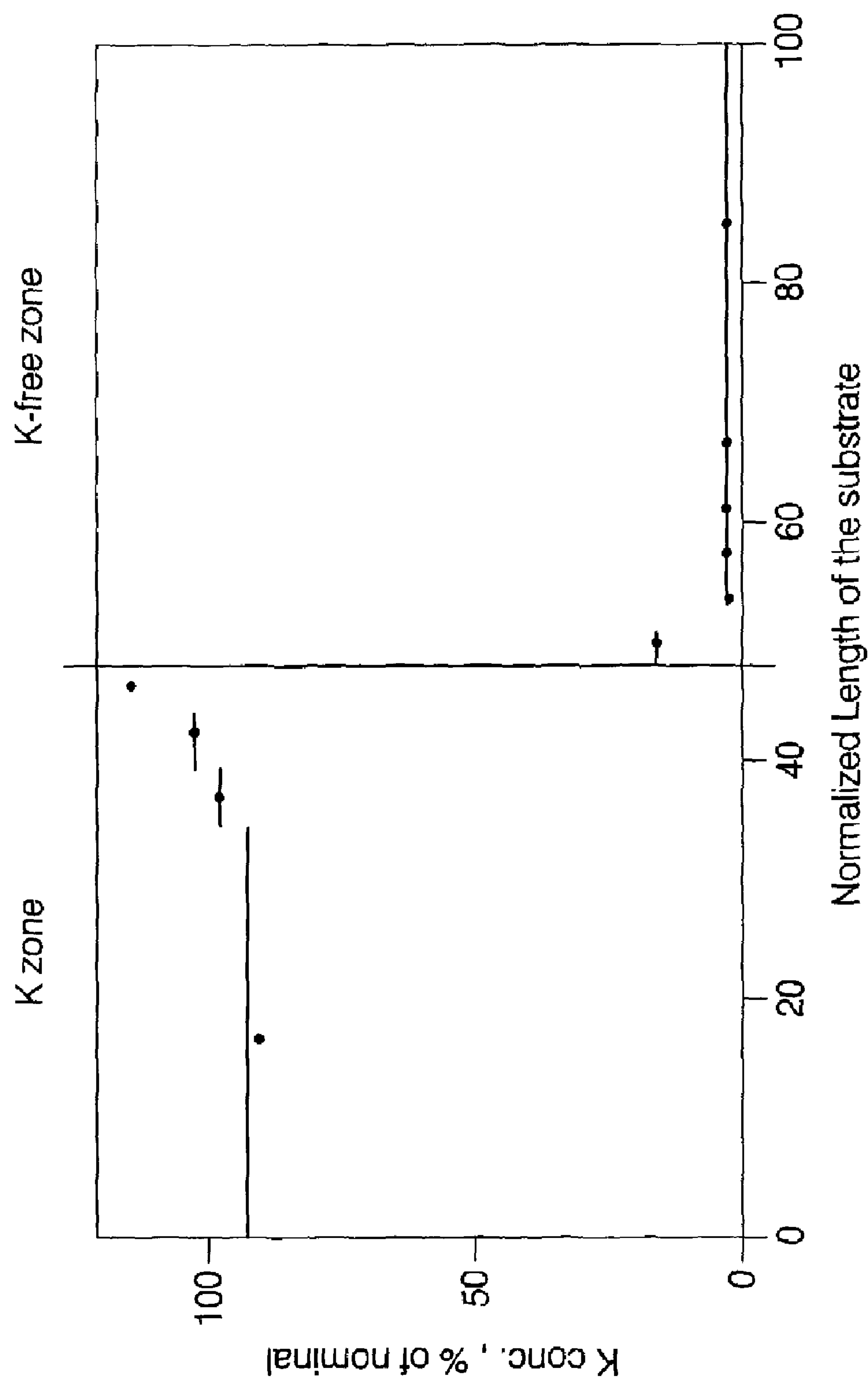
FIG. 3 is a schematic of the potassium distribution of a $NO_x$ adsorber catalyst with a potassium (K) banded zone of 52% of the total major axis length of the substrate.

FIG. 3 illustrates that the catalyst distribution along the substrate can be experimentally determined for an exemplary treatment element. FIG. 3 shows an exemplary catalyst component (e.g., alkali element) distribution of a treatment element prepared by the disclosed coating process. The catalyst composition in Zone 1 did not contain an alkali element, while the catalyst composition in Zone 2 did contain an alkali element (e.g., potassium). To determine the length of Zone 2 (the potassium-containing zone), the catalyst coated substrate was cut into slices (¼ inches in length) in the vicinity of the border of the catalyst 1 and catalyst 2 zones. The potassium concentration in the slices was determined by inductively coupled plasma spectrophotometry. Using this method, it was determined that the length of Zone 2 was 52% (left to right) of total substrate length. In the calculation of the first composition zone length, an assumption was made that the potassium border would be sharp. Thus, if the potassium concentration in the vicinity of the border was about 50% of the mean potassium concentration, then half of this section is 100% potassium coated and the other half is potassium free. Therefore, the length of the composition 1 and 2 zones can be experimentally determined.

The disclosed method is employed to form a treatment element comprising multiple zones of catalyst composition along the major axis (i.e., exhaust flow path) of a substrate. One advantage of the method is that multiple catalyst compositions can be applied to a single substrate. In the formation of an exhaust emission control device, packaging of a single substrate or brick leads to a simpler assembly process and a significant cost savings over the use of two or more substrate bricks. Another advantage of the disclosed method is that the catalyst volume and percentage of the substrate comprising a particular catalyst composition can be varied along the length of the substrate (i.e., along the exhaust flow path). Such catalyst control allows for optimization of catalyst performance for hydrocarbon, carbon monoxide and $NO_x$ control.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a treatment element for an exhaust emission control device, comprising:

applying a first catalyst composition along a first portion of a major axis of a single substrate;

applying a second catalyst composition along a second portion of the major axis of the single substrate to form a first catalyst zone and a second catalyst zone; and calcining the substrate;

wherein the first catalyst zone and the second catalyst zone are different and wherein at least one component of the first and second catalyst compositions differs by greater than or equal to about 10% between the two catalyst compositions.

2. The method of claim 1, wherein the first catalyst zone comprises a noble metal component and an alkaline earth metal component, and wherein the second catalyst zone comprises a noble metal component and an alkali element component.

3. The method of claim 2, wherein the first catalyst zone comprises a noble metal component loading of about 20 grams per cubic foot to about 150 grams per cubic foot, and an alkaline earth metal component loading of about 180 grams per cubic foot to about 2904 grams per cubic foot, based on the total volume of the substrate.

4. The method of claim 2, wherein the first catalyst zone comprises less than or equal to about 10 grams per cubic foot of an alkali element based on the total volume of the substrate.

5. The method of claim 2, wherein the second catalyst zone comprises a noble metal component loading of about 20 grams per cubic foot to about 150 grams per cubic foot, and an alkali element component loading of about 70 grams per cubic foot to about 1104 grams per cubic foot, based on the total volume of the substrate.

6. The method of claim 5, wherein the second catalyst composition further comprises an alkaline earth metal component at a loading of about 180 grams per cubic foot to about 2904 grams per cubic foot, based on the total volume of the substrate.

7. The method of claim 1, wherein the first catalyst zone comprises about 10% to about 90% of the single substrate, and the second catalyst zone comprises about 90% to about 10% of the single substrate, based on the total length of the substrate.

8. An exhaust emission control device comprising a treatment element disposed within a shell and a retention element disposed therebetween, wherein the treatment element is made by the method of claim 1.

9. A method of making an exhaust emission control device comprising;

applying a first catalyst composition along a first portion of a major axis of a single substrate;

applying a second catalyst composition along a second portion of the major axis of the single substrate;

calcining the substrate to form a treatment element comprising a first catalyst zone and a second catalyst zone, wherein the first catalyst zone and the second catalyst zone are different; and wherein at least one component of the first and second catalyst compositions differs by greater than or equal to about 10% between the two catalyst compositions; and disposing the treatment element within a shell and disposing a retention element therebetween.

10. The method of claim 9, wherein the first catalyst zone comprises a noble metal component and an alkaline earth metal component, and wherein the second catalyst zone comprises a noble metal component and an alkali element component.

11. The method of claim 10, wherein the first catalyst zone comprises a noble metal component loading of about 20 grams per cubic foot to about 150 grams per cubic foot, and an alkaline earth metal component loading of about 180 grams per cubic foot to about 2904 grams per cubic foot, based on the total volume of the substrate.

12. The method of claim 10, wherein the first catalyst zone comprises less than or equal to about 10 grams per cubic foot of an alkali element based on the total volume of the substrate.

13. The method of claim 10, wherein the second catalyst zone comprises a noble metal component loading of about 20 grams per cubic foot to about 150 grams per cubic foot, and an alkali element component loading of about 70 grams per cubic foot to about 1104 grams per cubic foot, based on the total volume of the substrate.

14. The method of claim 10, wherein the second catalyst composition further comprises an alkaline earth metal component at a loading of 180 grams per cubic foot to about 2904 grams per cubic foot, based on the total volume of the substrate.

15. The method of claim 10, wherein in the first catalyst composition is disposed in an exhaust stream upstream from the second catalyst composition.

16. The method of claim 10, wherein the first catalyst zone comprises about 10% to about 90% of the single substrate, and the second catalyst zone comprises about 90% to about 10% of the single substrate, based on the total length of the substrate.

* * * * *